United States Patent
Cushman et al.

(10) Patent No.: US 10,665,868 B2
(45) Date of Patent: May 26, 2020

(54) ELECTROCHEMICAL CELLS AND BATTERIES

(71) Applicants: Purdue Research Foundation, West Lafayette, IN (US); IFBattery Inc., Lafayette, IN (US)

(72) Inventors: John H. Cushman, West Lafayette, IN (US); Dennis H. Evans, West Lafayette, IN (US); Eric A. Nauman, West Lafayette, IN (US); Michael J. Mueterthies, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 163 days.

(21) Appl. No.: 16/062,092

(22) PCT Filed: Dec. 13, 2016

(86) PCT No.: PCT/US2016/066421
§ 371 (c)(1),
(2) Date: Jun. 13, 2018

(87) PCT Pub. No.: WO2017/106215
PCT Pub. Date: Jun. 22, 2017

(65) Prior Publication Data
US 2018/0375109 A1 Dec. 27, 2018

Related U.S. Application Data

(60) Provisional application No. 62/419,512, filed on Nov. 9, 2016, provisional application No. 62/348,607, filed (Continued)

(51) Int. Cl.
*H01M 6/24* (2006.01)
*H01M 4/96* (2006.01)
(Continued)

(52) U.S. Cl.
CPC ............. *H01M 6/24* (2013.01); *H01M 4/134* (2013.01); *H01M 4/136* (2013.01); *H01M 4/96* (2013.01);
(Continued)

(58) Field of Classification Search
None
See application file for complete search history.

(56) References Cited

U.S. PATENT DOCUMENTS

| 2,848,395 A | 4/1952 | Carignan |
| 4,416,743 A | 11/1983 | Holland |

(Continued)

OTHER PUBLICATIONS

Wu, Borong, et al., Lithium-air and lithium-copper batteries absed on a polymer stabilized interface between two immiscible electrolytic solutions (ITIES), New J. Chem., 2012, 36, 2140-2145. (Year: 2012).*

Mousavi Shaegh SA, et al., A review on membraneless laminar flow-based fuel cells, International Journal of Hydrogen Energy (2011), 1-20. (Year: 2011).*

(Continued)

*Primary Examiner* — Alix E Eggerding
(74) *Attorney, Agent, or Firm* — D'Hue Law LLC; Cedric A. D'Hue

(57) ABSTRACT

Membraneless electrochemical cells and batteries are disclosed. The cells comprise electrolyte solutions that are not miscible. The cells and batteries disclosed herein may be used to deliver electricity to process applications.

20 Claims, 7 Drawing Sheets

Related U.S. Application Data on Jun. 10, 2016, provisional application No. 62/267,152, filed on Dec. 14, 2015.

(51) Int. Cl.
| | |
|---|---|
| *H01M 12/06* | (2006.01) |
| *H01M 8/18* | (2006.01) |
| *H01M 8/20* | (2006.01) |
| *H01M 12/08* | (2006.01) |
| *H01M 4/134* | (2010.01) |
| *H01M 4/136* | (2010.01) |

(52) U.S. Cl.
CPC .............. *H01M 8/188* (2013.01); *H01M 8/20* (2013.01); *H01M 12/06* (2013.01); *H01M 12/08* (2013.01); *Y02E 60/128* (2013.01)

(56) References Cited

U.S. PATENT DOCUMENTS

| | | | |
|---|---|---|---|
| 2008/0283414 A1 | 11/2008 | Monroe et al. | |
| 2010/0129699 A1* | 5/2010 | Mikhaylik | H01M 2/1653 |
| | | | 429/50 |
| 2014/0272565 A1* | 9/2014 | Gronwald | H01M 2/145 |
| | | | 429/211 |

OTHER PUBLICATIONS

USPTO, International Search Report, in related application PCT/US16/66421, dated Apr. 21, 2017, 3 pages.

USPTO, Written Opinion of the International Search Authority, in related application PCT/US16/66421, dated Apr. 21, 2017, 7 pages.

\* cited by examiner

ELECTROCHEMICAL CELLS AND BATTERIES

RELATED APPLICATIONS

This application is a U.S. national stage application under 35 U.S.C. 371 of PCT international patent application PCT/US16/66421, filed Dec. 13, 2016, which claims the benefit of U.S. Provisional Patent Application Ser. No. 62/419,512, filed Nov. 9, 2016, U.S. Provisional Patent Application Ser. No. 62/348,607, filed Jun. 10, 2016, and U.S. Provisional Patent Application Ser. No. 62/267,152, filed Dec. 14, 2015. The contents of each of the aforementioned applications are incorporated herein by reference in their entirety.

BACKGROUND

Liquid batteries, whether flow or no-flow, are known in the art and work on the same principles as solid batteries, except the electrolyte is liquid. Such batteries are comprised of electrochemical cells which are based on reduction-oxidation chemistry. Oxidation occurs on the anode side of the cell and reduction on the cathode side. The solvents used in electrochemical cells are varied. In many circumstances, aqueous solutions are used on both sides of an electrochemical cell with each side (cathode side and anode side) in contact with an electrode (i.e., the cathode and anode respectively). The electrodes of the two-half cells are placed in electrical contact to allow for current to flow. To maintain charge balance, an electrochemical cell must also allow for the passage of ions. In elementary batteries, this is done with a salt bridge separating the cathode solution from the anode solution. The bridge prevents mixing of the two solutions. If the solutions were to mix, the half-cells could be destroyed by direct chemical reaction.

As with most batteries, flow batteries typically deploy a membrane separating the anode electrolyte from the cathode electrolyte. The role of the membrane is to allow for the exchange of ions but without mixing of the electrolyte solutions and thus the membrane preserves the electrochemical cell. In addition, for flow batteries, the electrolyte is continuously replaced (thus the terminology "flow"). Membranes, however, are a major weakness in batteries generally and in flow batteries in particular because they tend to degrade with time (especially in the presence of strong bases and acids) and are costly.

Membraneless flow batteries have been reported in the literature, but they too suffer from significant drawbacks. Such membraneless batteries are often termed "laminar" flow batteries because they rely on laminar flow to maintain separation of the analyte and the catholyte. A conventional laminar flow battery does not have a membrane and operates because of the slow rate of mixing of the two fluids in the laminar regime. However, mixing does occur, resulting in waste and, if allowed to progress, the mixing will short-circuit the battery. Membraneless systems have been proposed in which the electrolytes are selected on the basis of their pH. However, such systems can produce a precipitate at the interface between the electrolytes. Accordingly, there remains a need for further contributions in this area of technology.

SUMMARY

In one aspect of the disclosure, an electrochemical cell is provided comprising a cathode, an anode adjacent the cathode at a distance, a first polar electrolyte solution in contact with the cathode and disposed within the distance, a second polar electrolyte solution in contact with the anode and disposed within the distance, wherein the first and second electrolyte solutions are in contact with each other and are immiscible, and wherein there is no membrane in between the first and second electrolyte solutions.

In a further aspect of the disclosure, an electrochemical cell is provided comprising a cathode, an anode adjacent the cathode at a distance, a first polar acidic electrolyte solution in contact with the cathode and disposed within the distance, a second polar neutral electrolyte solution in contact with the anode and disposed within the distance, wherein the first and second electrolyte solutions are in contact with each other and are immiscible, and wherein there is no membrane in between the first and second electrolyte solutions.

In an additional aspect of the disclosure, an electrochemical cell is provided comprising a cathode, an anode adjacent the cathode at a distance, a first electrolyte solution in contact with the cathode and disposed within the distance, a second electrolyte solution in contact with the anode and disposed within the distance, wherein the first and second electrolyte solutions are in contact with each other and are immiscible, and wherein there is no membrane in between the first and second electrolyte solutions.

In a further aspect of the disclosure, electrochemical cells are provided comprising a first conducting material adjacent at a distance to a second conducting material, an anode in contact with the second conducting material, a second electrolyte solution in contact with the anode and the first conducting material disposed within the distance, and a first electrolyte solution disposed within the distance in contact with the first conducting material, wherein the first and second electrolyte solutions are not miscible; the first and second conducting material are in electrical contact, and wherein metal ions are in the first electrolyte solution.

In a still further aspect of the disclosure, electrochemical batteries are provided comprising one or more electrochemical cells of the disclosure.

In a further aspect of the disclosure, methods for delivering electricity to process applications from electrochemical cells of the disclosure are provided.

In yet an additional aspect of the disclosure, methods for delivering electricity to process applications from electrochemical batteries of the disclosure are provided.

DETAILED DESCRIPTION

Figure 1:
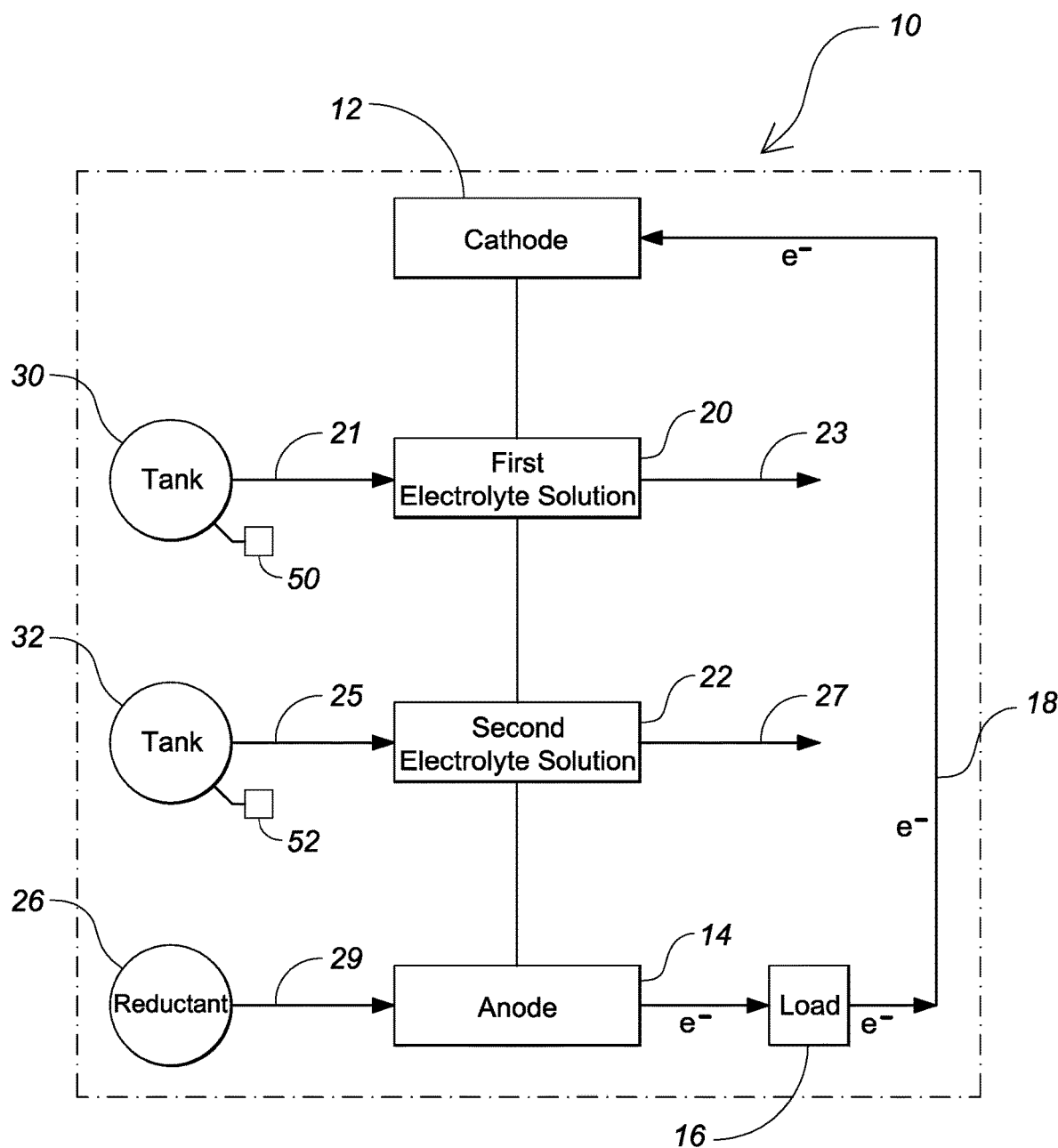
FIG. 1 is a schematic block diagram of an embodiment of an electrochemical cell according to the present disclosure.

The electrochemical cells and batteries of the disclosure operate without the need for membranes or other devices to separate the first electrolyte solution (at the cathode) from the second electrolyte solution (at the anode). When the terms "membraneless" or "without a membrane" or "wherein there is no membrane" or words to that effect are used, what is meant is that there is no membrane or other kind of separator between the first and second electrolyte solutions (and third electrolyte solutions in those embodiments). For example, whereas typical membranes are proton exchange membranes, a separator can operate by separating the anode and cathode of a battery, for example, and permit electrolyte ions to pass to maintain charge neutrality, but not the reactants associated with oxidation or reduction such as is used in the electrochemical cells of the disclosure. The electrochemical cells of the disclosure operate without any such membrane or separator between the electrolyte solutions, but a separator may be employed, for example, in between such cells in a voltaic pile. In typical cells of the disclosure, the first electrolyte solution, is an aqueous solution and the second electrolyte solution is an alcoholic solution. The solution at each electrode must contain the necessary components so that oxidation-reduction will occur, thus generating electricity.

For example, in one embodiment, at the cathode, vanadium undergoes reduction from $V^{5+}$ to $V^{4+}$. In that embodiment, at the anode, zinc is oxidized from $Zn(s)$ to $Zn^{2+}$. To enable the flow of positively charged ions, a methanol solvent with zinc solid on the anode side is further charged with ammonium chloride. The ammonium chloride dissolves and dissociates sufficiently to provide $NH_4^+$ in solution as a positively charged ion and $Cl^-$ as a negatively charged ion. On the cathode side, positively charged ions are provided by adding both sulfuric acid ($H_2SO_4$) and sodium sulfate ($Na_2SO_4$) to an aqueous $V^{5+}$ solution. The dissolution and dissociation into $H^+$ and $Na^+$ provides positively charged ions and $SO_4^{2-}$ as a negatively charged ion on the cathode side of the electrochemical cell. In addition, the sodium sulfate prevents the mixing of the first and second electrolyte solutions and maintains their immiscibility. Further, since water is denser than methanol, buoyancy forces cause the methanol solution to layer on top of the denser aqueous solution. This layering of immiscible fluids (salt water is immiscible with methanol or ethanol) effectively and advantageously eliminates the need for a membrane for separation. Such embodiments may be configured for flow or for no-flow operation as described further herein. Further, in such embodiments the zinc may be in contact with a conducting material such as conducting carbon and the cathode solution may also be in contact with such a conducting material.

Electrochemical batteries of one or more cells, including greater than one cell, may be prepared by combining electrochemical cells of the disclosure in parallel or in series. Examples include a voltaic pile of cells. Separators or interconnects may be used to separate adjacent cells to prevent short-circuiting such batteries but still provide for electrical communication. Such cells and batteries may be used to deliver or receive electricity to process applications such as solar farms and wind farms, vehicles, electrical grids, household appliances, consumer products, and toys.

According to many embodiments of the present disclosure, and as shown in FIG. 1, an electrochemical cell 10 is provided. The electrochemical cell 10 includes a cathode 12 and an anode 14 separated by a first electrolyte solution 20 and a second electrolyte solution 22 such that the first electrolyte solution 20 is in contact with the cathode 12 and such that the second electrolyte solution 22 is in contact with the anode 14. The first electrolyte solution 20 and the second electrolyte solution 22 are immiscible and in contact with each other and thus can enable ion and electron exchange (e.g., $H^+$ and $e-$) between the anode 14 and the cathode 12. Each cell 10 may be electrically connected to a load 16 by a circuit 18 to enable a current flow via the circuit. Note that the vertical lines connecting the electrolyte solutions and the cathode and anode electrodes in the schematic are not conduits but are merely to aid in the viewing of the schematic.

In certain embodiments, the first electrolyte solution 20 may be a positive electrolyte or catholyte, and the second electrolyte solution 22 may be a negative electrolyte or anolyte (and immiscible). In many embodiments, the densities of the first electrolyte solution and the second electrolyte solution are different with the first electrolyte solution 20 being denser than the second electrolyte solution 22 such that when the cell 10 is oriented vertically with cathode 12 at the bottom, the buoyancy effect causes the second electrolyte solution 22 to layer above the first electrolyte solution 20.

In many embodiments, the cell 10 may optionally be configured to run in flow mode so as to support a flow battery for example. In such a battery, electrolyte solutions are provided to the cell during the operation of the battery continuously during operation. For example, the first electrolyte solution 20 and the second electrolyte solution 22 may flow into the cell 10 and between the cathode 12 and the anode 14 from a first source, such as a tank, 30, or other suitable storage device, and a second source, such as a tank, 32, or other suitable storage device, respectively, as shown in FIG. 1 via conduits 21 and 25 respectively. The first electrolyte solution 20 and second electrolyte solution 22 may further flow out of the cell 10 via conduits 23 and 27 respectively. They may be directed to waste or to other tanks. In some embodiments, flow could be reversed from said other tanks to recharge cell 10. The flows may be generated by pumps 50, 52 or by capillarity, reverse osmosis, a ratchet, swelling pressure, or gravity. The flows of the first electrolyte solution 20 and the second electrolyte solution 22 may be maintained within a laminar flow regime. In alternative embodiments, the first electrolyte solution 20 and the second electrolyte solution 22 may not flow through the cell 10 but may be replaceable.

In these and other embodiments of the disclosure both the first and second electrolyte solutions may be polar and of different densities. In many examples, the first polar electrolyte solution contains water and a salt. In some embodiments, the solution is saturated with respect to the salt. Examples of salts include metal halides or ammonium salts such as sodium chloride, magnesium chloride, lithium chloride and ammonium chloride. Other salts include sodium sulfate, calcium sulfate, potassium sulfate, and ammonium sulfate among others. The first polar electrolyte solution or the second polar electrolyte solution, or both, may be neutral or made basic, such as by addition of sodium hydroxide, potassium hydroxide, calcium hydroxide, or a combination thereof.

In such embodiments, the second electrolyte solution may contain an alcohol. Other constituents may include a salt, such as a metal halide or ammonium salt, examples being sodium chloride, magnesium chloride, lithium chloride and ammonium chloride. Suitable alcohols for use in the second electrolyte solution include methanol and ethanol.

Cathodes and anodes of the various embodiments may be selected from suitable materials. Example of suitable cathodes, include steel, carbon such as in the graphite allotrope of carbon, and carbon impregnated with a metal. Conducting carbon cloth, for example, is a suitable cathode for many embodiments and is a conducting material. Suitable anodes include metals such as platinum, zinc, lithium, nickel, calcium, magnesium or aluminum.

When an electrolyte solution is prepared, typically an electrolyte, often a solid, is disposed within a solvent which then becomes an electrolyte solution. For example, when an electrolyte is disposed within a solvent where it can dissolve, the dissolution of the electrolyte solid will create ions and, if they dissociate sufficiently, the solvent becomes an electrolyte solution. In addition, other components are added to the solvent so that oxidation will occur at the anode and reduction at the cathode. Examples of such a component is zinc metal. When added at the anode of an operating electrochemical cell, zinc will oxidize to $Zn^{2+}$. On the cathode side, one such component example is $NH_4VO_3$ which dissolves and dissociates to produce $V^5$, which will be reduced to $V^{4+}$ in an operating electrochemical cell. In many such embodiments of the disclosure, the first electrolyte solution comprises a component which dissociates into an ion selected from $ClO^-$, $Fe^{3+}$, $V^{5+}$, $Br_2$, and $S_2O_8^{2-}$, which ions are reduced at the cathode. In these and other embodiments, the second electrolyte solution comprises a component which oxidizes into an ion selected from $Li^+$, $Ca^{2+}$, $Al^{3+}$, $Mg^{2+}$, $V^{2+}$, $Zn^{2+}$, $SiO_3^{2+}$, $[Zn(CN)_4]^{2-}$, and $[Zn(OH)_4]^{2-}$, which ions result from oxidation at the anode.

In these and other embodiments, the first electrolyte solution may be polar and acidic and the second electrolyte solution may be polar and neutral and the first and second electrolyte solutions are of different densities. In such embodiments, a strong acid, such as sulfuric acid (e.g., 1M) may be used to make the first polar electrolyte solution acidic. With respect to the electrolytes, a salt such as sodium sulfate or sodium chloride may be present in the first electrolyte solution and ammonium chloride in the second electrolyte solution. The solution may be saturated with respect to the salt selected. The second polar and neutral electrolyte solution in such embodiments comprises a solvent such as an alcohol. Examples of alcohols that may act as solvents herein include methanol and ethanol.

In some embodiments, the anode is aluminum and the cathode is carbon or steel, the first electrolyte solution contains water and $ClO^-$, and the second electrolyte solution contains ethanol or methanol. In such embodiments, for example, each electrolyte contains a base such as NaOH, and a salt, LiCl which results in immiscible electrolyte solutions. The voltage supplied by such an electrochemical cell is between 1.5 and 2.1 volts. Such an electrochemical cell may create amperages of between about 0.1 and about 0.4 amps including about 0.2 and about 0.3 amps. Examples of components providing $ClO^-$ include Na(ClO) and Ca(ClO)$_2$. In such a cell, $ClO^-$ will be reduced at the cathode according to equation 1:

$$ClO^- + H_2O + 2e^- \rightarrow Cl^-(aq) + 2OH^-(aq) \qquad \text{EQ. 1}$$

The second electrolyte may contain a component that is a metal that oxidizes, such as aluminum oxidizing to $Al^{3+}$ as per equation 2:

$$Al(s) \rightarrow Al^{3+}(aq) + 3e^- \qquad \text{EQ.2}$$

Another anode choice may be magnesium which oxidizes per equation 3:

$$Mg(s) \rightarrow Mg^{2+}(aq) + 2e^- \qquad \text{EQ. 3}$$

or Vanadium which oxidizes per equation 4:

$$V(s) \rightarrow V^{2+}(aq) + 2e^- \qquad \text{EQ. 4}$$

In certain embodiments, the first electrolyte solution 20 may include a solution of diatomic bromine ($Br_2$), tetraalkyl ammonium bromide salt and ethyl acetate, and the second electrolyte solution 22 may include an aqueous solution including hydrogen bromide (hydrobromic acid). Alternatively, the first electrolyte solution 20 may be denser than the second electrolyte solution 22. In such embodiments, a reductant 26, such as shown in FIG. 1, may optionally be supplied to the anode 14 via conduit 29 to donate electrons to the second electrolyte solution 22. In at least one embodiment, the reductant may be hydrogen ($H_2$) gas, and the anode 14 via conduit 29 may be comprised of any suitable charge collector including, for example, a Platinum catalyst. In such an embodiment, the chemical reaction at the anode 14 is:

$$H_2 - 2e^- \rightarrow 2H^+ \text{ (in aqueous solution for example)} \qquad \text{EQ. 5}$$

The cathode 12 may be comprised of any suitable material including, for example, graphite. The current flow in the circuit 18 enables a reduction reaction at the cathode 12. The first electrolyte solution 20 may be reduced as:

$$Br_2 + 2e^- \rightarrow 2Br^- \text{ (in ethyl acetate for example)} \qquad \text{EQ. 6}$$

In other certain embodiments, a cell 10 may include first electrolyte solution 20 and second electrolyte solution 22. In at least one embodiment, the first electrolyte solution 20 may contain liquid bromine having a density of approximately 3.12 g/cm$^3$. The second electrolyte solution 22 may contain HBr in H$_2$O which is less dense. In such an embodiment, because the second electrolyte solution 22 is less dense than the first electrolyte solution 20, the buoyancy effect will cause the second electrolyte solution 22 to layer above the first electrolyte solution 20. Further, because HBr in water is immiscible with liquid bromine, the layers of the first electrolyte solution 20 and second electrolyte solution 22 will not mix significantly at the interface therebetween. Accordingly, the anode 14 in contact with the second electrolyte solution 22 may be disposed above the cathode 12 in contact with the first electrolyte solution 20. Consequently, the reaction at the anode 14 is the same as shown in EQ. 5, and the reaction at the cathode 12 is the same as shown in EQ. 6.

In electrochemical batteries of the disclosure, it may be useful to stack more than one electrochemical cells. The stacking of cells may be enabled, for example, by the use of three or more immiscible fluids having three or more different densities. In such embodiments, a second cathode opposite the first cathode at a second distance from the anode is provided and a third electrolyte solution in contact with the second cathode and the second electrolyte solution is further provided wherein the third and second electrolyte solutions are in contact with each other and are immiscible, and wherein there is no membrane in between the third and second electrolyte solutions. The third electrolyte solution may be polar and will be a greater density than the first two electrolyte solutions. An example of a third electrolyte solution that is denser than water is one that contains propylene carbonate as a solvent. The third electrolyte solution may contain a salt and may be saturated with respect to that salt. Batteries with such cells may be configured in flow or no flow mode.

Figure 2A:
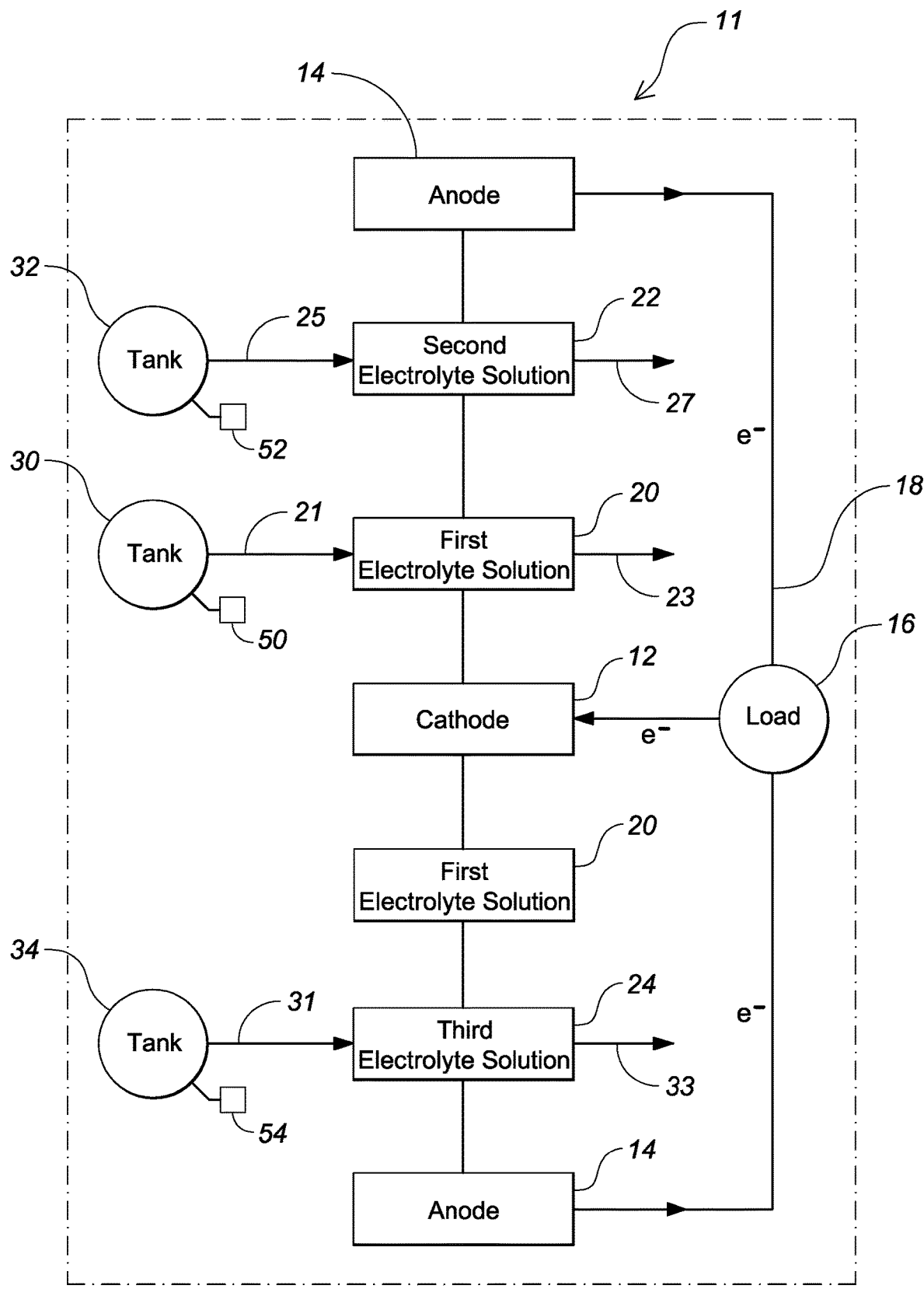
FIG. 2A is a schematic block diagram of an embodiment of an electrochemical cell according to the present disclosure.

In at least one embodiment according to the present disclosure, as shown in FIG. 2A, a battery may include a cell 11 including a first electrolyte solution 20, a second electrolyte solution 22, and a third electrolyte solution 24. In such an embodiment, the cell 11 includes one cathode 12 operating with two anodes 14 to generate electricity supplied to the load 16 via circuit 18. In such an embodiment, the third electrolyte solution 24 is denser than the first electrolyte solution 20 and the second electrolyte solution 22. The third electrolyte solution 24 is immiscible relative to the first electrolyte solution 20 and/or the second electrolyte solution 22. Accordingly, the second electrolyte solution 20 is disposed in a layer above the first electrolyte solution 22, and the first electrolyte solution 22 is disposed in a separate layer above the third electrolyte solution 24. Optional tanks 30 and 32, acting as sources for electrolyte solutions, and pumps 50 and 52 (or by capillarity, reverse osmosis, a ratchet, swelling pressure, or gravity), may be used to deliver electrolyte solutions to the cell in flow mode, for example via conduits 21 and 25 respectively. The first electrolyte solution 20 and second electrolyte solution 22 may further flow out of the cell 11 via conduits 23 and 27 respectively. They may be directed to waste or to other tanks. In some embodiments, flow could be reversed from said other tanks to recharge cell 11. In other embodiments, the cell can be arranged with a cathode on top and bottom and an anode in the middle.

As shown in FIG. 2A, the third electrolyte solution 24 may be supplied to the cell 11 from a third source 34 via conduit 31 with pump 54 (or by capillarity, reverse osmosis, a ratchet, swelling pressure, or gravity) which may be used in flow mode. The third electrolyte solution 24 may further flow out of cell 11 via conduit 33. This may be directed to waste or to another tank. In some embodiments, flow could be reversed from said another tank to recharge cell 11. In embodiments in which the third electrolyte solution 24 flows through the cell 11, the third electrolyte solution 24 may be directed to waste or to other tanks. In some embodiments, flow could be reversed and from the other tanks to recharge the cells. Alternatively, the third electrolyte solution 24 may not flow through the cell 11 but may be replaceable. Note that the vertical lines connecting the electrolyte solutions and the cathode and anode electrodes in the schematic are not conduits but are merely to aid in the viewing of the schematic.

Figure 2B:
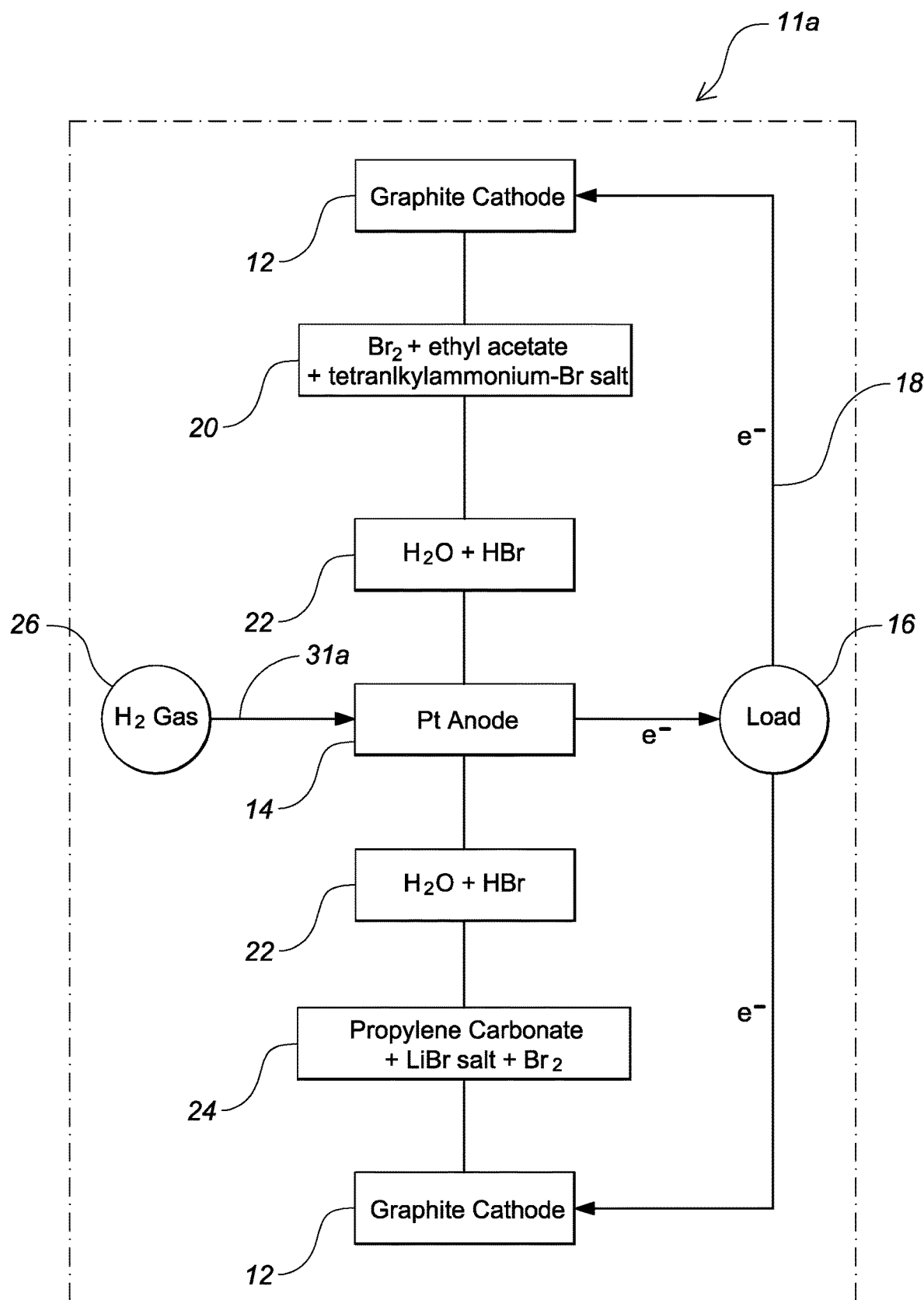
FIG. 2B is a schematic block diagram of an embodiment of an electrochemical cell according to the present disclosure

In FIG. 2B, electrochemical cell 11a is a three-layer system presented with two cathodes 12 and one anode 14. First electrolyte solution 20 is in contact with cathode 12 and second electrolyte solution 22 which in turn is in contact with anode 14 and third electrolyte solution 24. Cathode 12 is in contact with the third electrolyte solution 24 and load 16 via circuit 18. An optional reductant ($H_2$ gas) 26 may supply the $H_2$ to anode 14 via conduit 31a. Flow tanks, conduits, and pumps (or by capillarity, reverse osmosis, a ratchet, swelling pressure, or gravity) may be used to run electrochemical cell 11a in flow mode and thus allow for recharging. Note that the vertical lines connecting the electrolyte solutions and the cathode and anode electrodes in the schematic are not conduits but are merely to aid in the viewing of the schematic.

In at least one embodiment according to the present disclosure, the batteries and cells of the disclosure may employ porous media to stabilize and enhance performance. The use of porous media affects some or all of the following characteristics of batteries and electrochemical cells of the disclosure: wettability boundary conditions; no slip and slip boundary conditions; conductivity, including resistivity and friction; dispersivity or mixing between adjacent fluids; porosity (e.g., relative volume for flow); tortuosity (e.g., length and complexity of trajectories); connectivity (e.g., species and electrical); particle size distribution (e.g., packing); relative conductivity (e.g., multiphase resistivity); multiscale (e.g., discrete scale separation); surface absorptivity (e.g., double layer capacitance); surface reactivity (e.g., pseudo capacitance); diagenesis (e.g., dissolution or deposition); and swelling (e.g., interfacial forces). The porous media may include nanostructures or nanoparticles. Such porous media may be used, for example, at the cathode or anode. Examples of such porous media include micro- or nano-porous graphite. For example, in at least one embodiment according to the present disclosure, cell 10 may employ a nano-porous or micro-porous $Br_2$-saturated graphite cathode 12. Such a cathode 12 can be thought of as a reduction cathode 12 that accepts electrons to form the reaction according to EQ. 4 at the $Br_2$-graphite interface. The graphite is porous with desirably high specific surface area and is saturated with $Br_2$.

Figure 3:
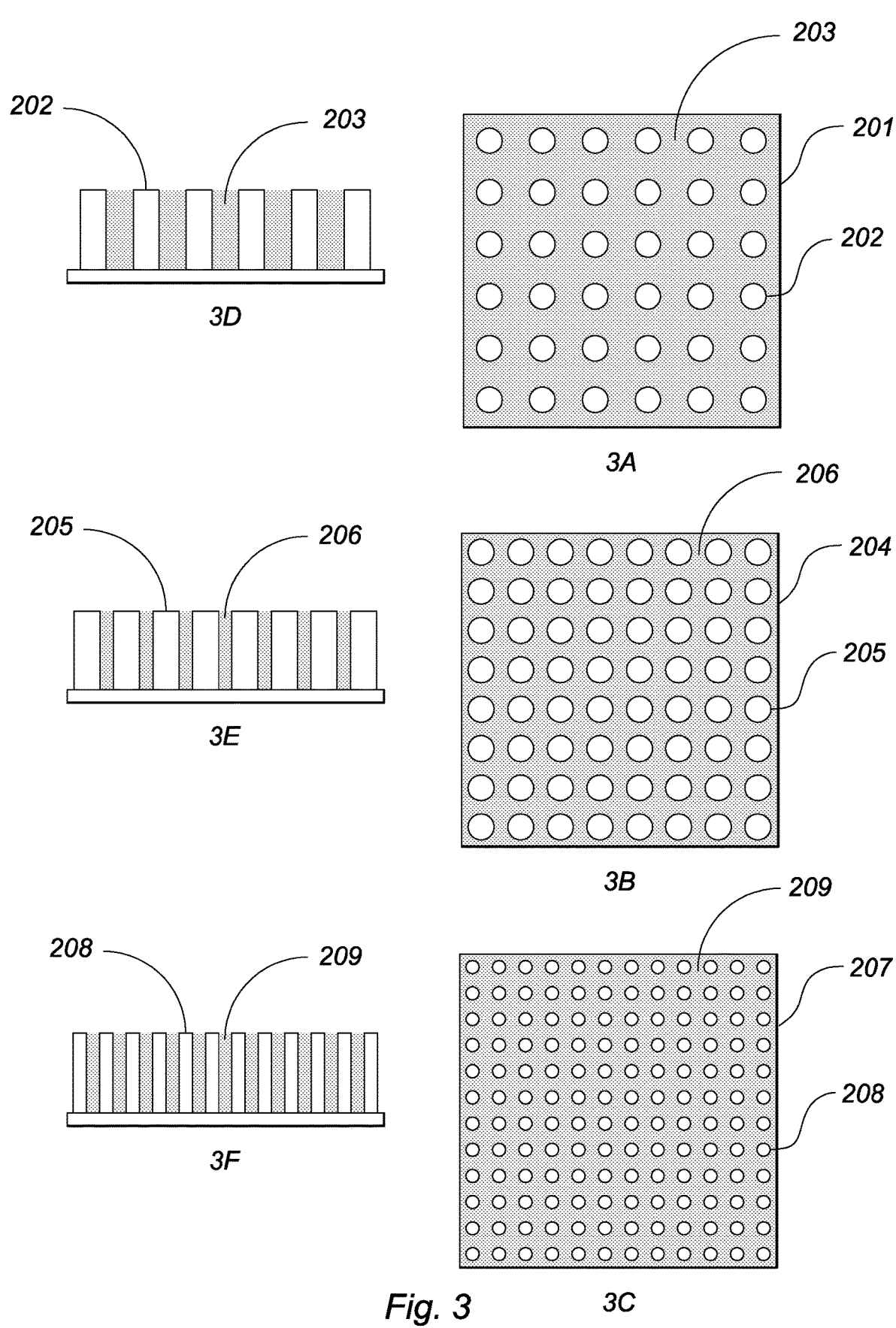
FIG. 3A is a top-down view of an electrochemical battery embodiment of the disclosure.
FIG. 3B a top-down view of an electrochemical battery embodiment of the disclosure FIG. 3C a top-down view of an electrochemical battery embodiment of the disclosure
FIG. 3D is a side view of FIG. 3A.
FIG. 3E is a side view of FIG. 3B.
FIG. 3F is a side view of FIG. 3C.
Figure 4:
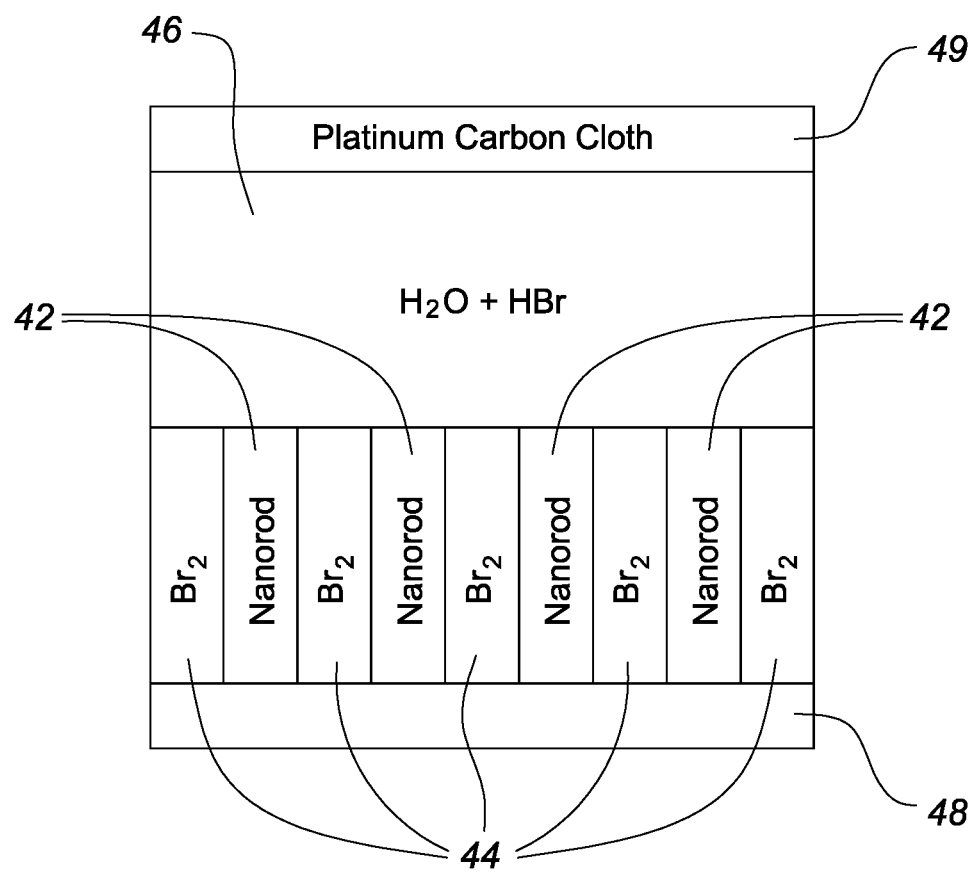
FIG. 4 is a schematic of an embodiment of a series of electrochemical cells of the disclosure.

FIGS. 3A, 3B, and 3C show top-down views of embodiments of porous media carbon nanorods saturated with $Br_2$. FIGS. 3D, 3E, and 3F are corresponding side views. In these Figures, carbon nanorods 202, 205, and 208 are disposed on surfaces 201, 204, and 207 respectively with interstitial spaces containing liquid $Br_2$ 203, 206, and 209 respectively. Water and HBr may be deployed on top of the surface made by the top of the nanorods as illustrated in FIG. 4. Any conducting porous substrate with high specific surface area can be used instead of carbon nanorods. Further, graphite in varying forms can be used, including for example, powdered graphite.

In addition, as shown in FIG. 4, a side view of any of FIGS. 3A, 3B, and 3C is provided. Anode 49, a platinum embedded carbon cloth, is separated from the bromine-saturated carbon-nanorod cathode 42 shown as an array of nanorods, with the water and HBr fluid flowing through the middle 46. Liquid $Br_2$ fills the spaces 44 in between the nanorods. A conducting material such as conducting carbon or steel 48 is in contact with nanorods 42 and $Br_2$ cavities 44. The $Br_2$ can be wicked up from a reservoir without the need for a convective flow field and still remaining at constant density.

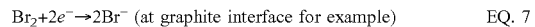

$Br_2 + 2e^- \rightarrow 2Br^-$ (at graphite interface for example)     EQ. 7

The electrochemical cells may be used individually as batteries or combined for use in a battery. Such batteries may be rechargeable.

In some embodiments, a first and second electrolyte solution are of different densities and immiscible due to the presence of a salt in the first electrolyte solution and are in contact without a membrane. Further, the cell is configured to run in a no flow mode. Batteries may be made of such cells such as in parallel or series geometry and/or a voltaic pile. The electricity from such batteries may be delivered to a process application such as solar farms, wind farms, household appliances, consumer goods, or toys.

Example 1

Figure 5:
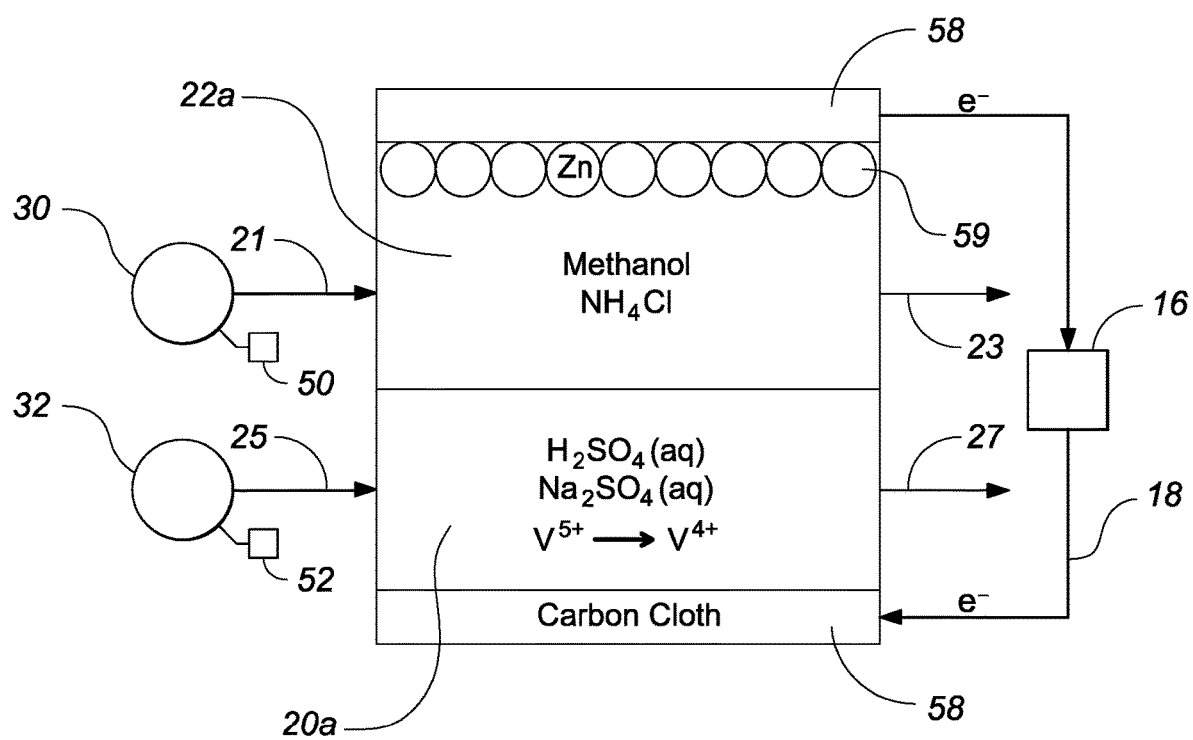
FIG. 5 is a schematic of an embodiment of an electrochemical cell of the disclosure.

V/Zn Electrochemical Cell/Battery with Immiscible Electrolyte Solutions without a Membrane A no flow electrochemical cell/battery configured in accordance with the schematic of FIG. 5 (other than the flow portion of the schematic) was prepared. The figure represents both an electrochemical cell and a battery with a battery being defined as containing one or more electrochemical cells. The cell/battery was made from acrylic. A conducting carbon (graphite) cloth 58 was affixed to zinc-metal particles 59 inside a neutral electrolyte solution of ammonium chloride in methanol 22a. On the cathode side, a 1M sulfuric acid solution 20a containing on the order of 1% by mass sodium sulfate was used. The cathode was prepared by adding solid $NH_4VO_3$ as the electrolyte. The solid dissolved readily in the acidic solution to provide $V^{5+}$ in solution 20a. As with the anode side, the cathode side contains a carbon (graphite) cloth 58. Both carbon cloths are electrically in contact through the Load 16 via circuit 18.

The cell/battery of FIG. 5 could be run in flow mode by attaching optional tanks 30 and 32 and pumps 50 and 52 (or by capillarity, reverse osmosis, a ratchet, swelling pressure, or gravity) via conduits 21 and 25 respectively. The outflow from the cell/battery 23 and 27 could be routed to waste or to an external tank so that recharge could occur by reversing polarities.

The electrochemical cell/battery generates 1.7 volts through the combination of the anode and cathode reactions. On the anode side, the oxidation of zinc from Zn to $Zn^{2+}$ was measured to be 0.7 volts whereas the reduction of $V^{5+}$ to $V^{4+}$ generates a voltage of 1.0 with a total cell/battery delivery of 1.7 volts at 0.33 A with a one ohm resistance. The vanadium is further reduced to $V^{3+}$ and $V^{2+}$ in further reactions. Although each solution is polar, the different electrolyte solutions are immiscible. Further, they have different densities with the sulfuric acid solution being denser, and thus on the bottom and the less dense neutral methanol solution on top.

In other V/Zn embodiments, such electrochemical cells may be used to each produce voltages from between about 1 and 2.5 volts including between about 1 and 2 volts, between about 1 and 1.6 volts, between about 1.6 and 1.8 volts and about 1.1, 1.2, 1.3, 1.4, 1.5, 1.6, 1.7, 1.8, 1.9, or 2.0 volts. Other voltages are greater than 2 volts and include between about 2.1 and 2.3 volts including about 2.2 volts. If desired, lower voltages may be delivered such as between about 0.5 and 1 volt. The amps produced by the cells are typically greater than 0.25 A including 0.33 amps and higher (with a one ohm resistance). The use of the word "about" herein is used to account for measurement error associated with measuring voltages or amps by those of ordinary skill in the art using typical measuring devices of the art.

Example 2

Figure 6:
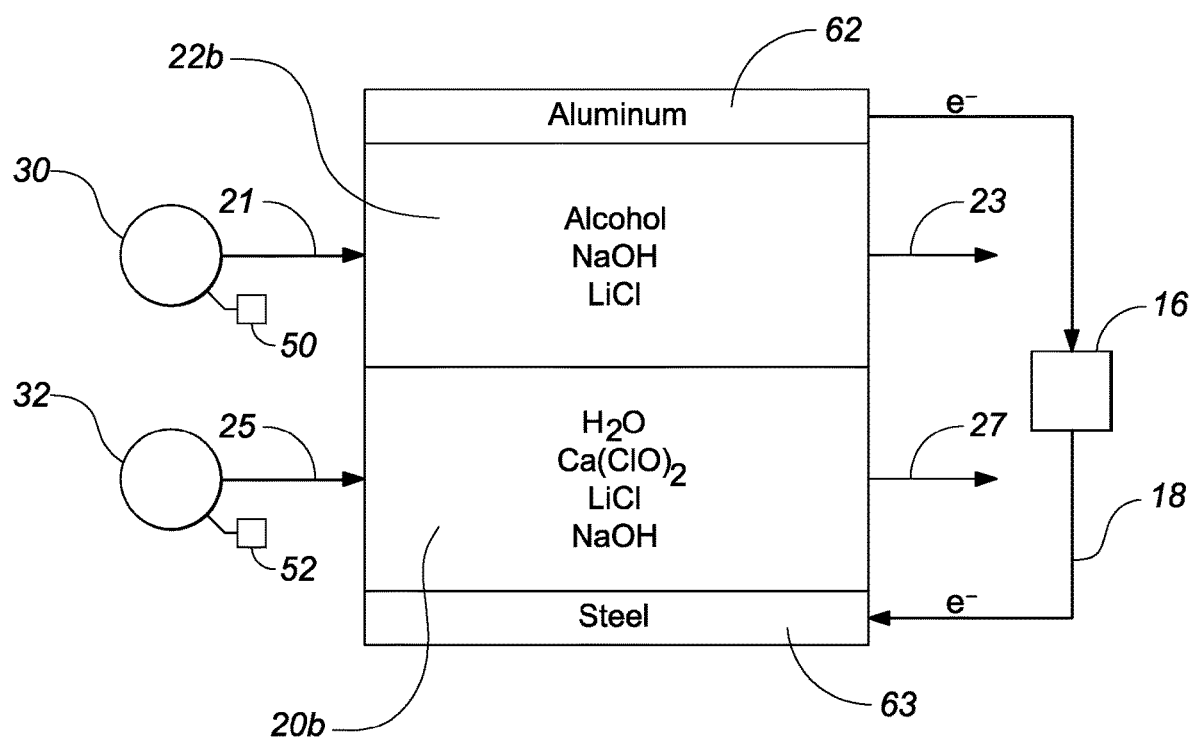
FIG. 6 is a schematic of an embodiment of an electrochemical cell of the disclosure.

Al/Hypochlorite Electrochemical Cell/Battery with Immiscible Electrolyte Solutions without a Membrane A no flow electrochemical cell/battery configured in accordance with the schematic of FIG. 6 (other than the flow portion of the schematic) was prepared. The figure represents both an electrochemical cell and a battery with a battery being defined as containing one or more electrochemical cells. The cell/battery was made in a glass beaker. Aluminum solid was used as anode 62 and electrically connected via circuit 18 and Load 16 to cathode 63, conducting carbon cloth or steel depending on the specific experiment. The anode was placed in an electrolyte solution 22b containing ethanol or methanol (multiple were tested), lithium chloride and sodium hydroxide. The cathode was placed in contact with an electrolyte solution 20b containing NaClO or $Ca(ClO)_2$ depending on the specific experiment, resulting in $ClO^-$ ion dissolved in a solution containing sodium hydroxide, lithium chloride, and water. Although each solution is polar, the different electrolyte solutions are immiscible. Further, they have different densities with the hypochlorite solution being denser, and thus on the bottom and the less dense neutral alcohol (ethanol or methanol) solution on top. The cell/battery of FIG. 6 could be run in flow mode by attaching optional tanks 30 and 32 and pumps 50 and 52 (or by capillarity, reverse osmosis, a ratchet, swelling pressure, or gravity) via conduits 21 and 25 respectively. The outflow from the cell/battery 23 and 27 could be routed to waste or to an external tank for recharge purposes via reversing polarity.

In no flow mode, such a cell/battery was measured to provide an initial output of over 2 volts with amperage of up to 0.3 amps at a 1 ohm load.

In the various descriptions above, electrochemical cells are stacked vertically. In alternative embodiments, adjacent electrochemical cells, for example, may be disposed in other orientations to make batteries.

A variety of embodiments according to the present disclosure are contemplated. Such embodiments may be employed in a variety of methods, processes, procedures, steps, and operations as a means of providing electrochemical cells and batteries. While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims. Indeed, this disclosure is not intended to be exhaustive or to limit the scope of the disclosure.

What is claimed is:

1. An electrochemical cell comprising:
    a. a cathode;
    b. a metal anode adjacent the cathode at a distance;
    c. a first electrolyte solution comprising water, a metal chloride salt, and a component which dissociates into ions selected from $ClO^-$, $Fe^{3+}$, and $S_2O_8^{2-}$, the first electrolyte solution in contact with the cathode and disposed within the distance; and
    d. a second electrolyte solution comprising a solvent in contact with the anode and disposed within the distance,
    wherein the first and second electrolyte solutions are in contact with each other and are immiscible, and wherein there is no membrane in between the first and second electrolyte solutions.

2. The electrochemical cell of claim 1, wherein the first electrolyte solution and the second electrolyte solution each further comprise sodium hydroxide.

3. The electrochemical cell of claim 1 wherein the metal anode is aluminum.

4. The electrochemical cell of claim 1 wherein the metal chloride salt is lithium chloride or sodium chloride.

5. The electrochemical cell of claim 4, wherein the metal chloride salt is lithium chloride salt.

6. An electrochemical battery comprising one or more electrochemical cells of claim 1.

7. The electrochemical cell of claim 1, wherein the solvent in the second electrolyte solution is an alcohol.

8. The electrochemical cell of claim 7, wherein the alcohol in the second electrolyte solution is methanol or ethanol.

9. The electrochemical cell of claim 1 wherein the cell is configured to run in a flow mode.

10. The electrochemical cell of claim 9 wherein the cathode is graphite.

11. The electrochemical cell of claim 1 wherein the cathode is carbon or carbon impregnated with a metal.

12. The electrochemical cell of claim 1 wherein the second polar electrolyte solution is basic or neutral.

13. The electrochemical cell of claim 1 wherein the first electrolyte solution comprises $ClO^-$ ions.

14. The electrochemical cell of claim 1 wherein the first electrolyte solution comprises $Fe^{3+}$ ions.

15. The electrochemical cell of claim 1 wherein the first electrolyte solution comprises $S_2O_8^{2-}$ ions.

16. The electrochemical cell of claim 1 wherein the second electrolyte solution comprises a component which oxidizes into an ion selected from $Li^+$, $Ca^{2+}$, $Al^{3+}$, $Zn^{2+}$, $SiO_3^{2+}$, $[Zn(CN)_4]^{2-}$, and $[Zn(OH)_4]^{2-}$.

17. A method of delivering electricity from an electrochemical cell of claim 1 to a process application.

18. The method of claim 17, wherein the process application is solar farms, wind farms, household appliances, consumer products, and toys.

19. A method of delivering electricity from a battery of claim 1 to a process application.

20. The method of claim 19, wherein the process application is solar farms, wind farms, household appliances, consumer products, and toys.

* * * * *